(12) United States Patent
Bodie et al.

(10) Patent No.: US 6,979,152 B2
(45) Date of Patent: Dec. 27, 2005

(54) INTAKE NOZZLE FOR VACUUM CONVEYOR

(75) Inventors: Cameron Dwight Bodie, Moose Jaw (CA); Don Grant Vass, Regina (CA)

(73) Assignee: Brandt Industries Ltd., Regina (CA)

( * ) Notice: Subject to any disclaimer, the term of this patent is extended or adjusted under 35 U.S.C. 154(b) by 0 days.

(21) Appl. No.: 10/864,795

(22) Filed: Jun. 9, 2004

(65) Prior Publication Data

US 2004/0265071 A1 Dec. 30, 2004

(30) Foreign Application Priority Data

Jun. 27, 2003 (CA) .................................. 2433702

(51) Int. Cl.⁷ .............................................. B65G 53/42
(52) U.S. Cl. ...................... 406/152; 15/415.1; 37/318; 37/335
(58) Field of Search .................. 406/152; 15/419, 15/420, 415.1, 418, 421; 37/335, 317, 318

(56) References Cited

U.S. PATENT DOCUMENTS

| | | | | | |
|---|---|---|---|---|---|
| 530,829 | A | * | 12/1894 | Duckham | 406/152 |
| 1,053,665 | A | * | 2/1913 | Spencer | 15/415.1 |
| 1,416,013 | A | * | 5/1922 | Gieseler | 406/152 |
| 1,508,521 | A | * | 9/1924 | Kreuser | 37/318 |
| 2,176,139 | A | * | 10/1939 | Einar | 251/145 |
| 2,529,499 | A | * | 11/1950 | Jankelson | 433/96 |
| 2,831,732 | A | * | 4/1958 | Rieser | 406/152 |
| 3,233,463 | A | * | 2/1966 | Kaufmann et al. | 73/864.33 |
| 3,301,606 | A | * | 1/1967 | Bruno | 406/85 |
| 4,028,009 | A | * | 6/1977 | Gudzenko et al. | 166/51 |
| 4,205,412 | A | * | 6/1980 | Weber | 15/345 |
| 4,302,052 | A | * | 11/1981 | Fischer | 299/67 |
| 4,551,042 | A | * | 11/1985 | Hagedorn et al. | 406/93 |
| 5,037,246 | A | * | 8/1991 | Okano et al. | 406/152 |
| 5,924,823 | A | * | 7/1999 | Palffy | 406/152 |

* cited by examiner

Primary Examiner—Joe Dillon, Jr.
(74) Attorney, Agent, or Firm—Frost Brown Todd LLC

(57) ABSTRACT

An intake conduit apparatus comprises an intake conduit adapted at a downstream output end thereof for connection to an intake of a vacuum conveyor, and adapted at an upstream input end thereof to facilitate entry of granular material. Ramps slope inward and downstream from the interior wall of the intake conduit, and there is a vent hole through the wall of the intake conduit adjacent to a downstream end of each ramp such that air enters the intake conduit adjacent to the downstream end of each ramp.

18 Claims, 1 Drawing Sheet

INTAKE NOZZLE FOR VACUUM CONVEYOR

This invention claims priority benefit of Canadian Patent Application Ser. No. 2,433,702, filed Jun. 27, 2003.

This invention is in the field of pneumatic or vacuum conveyors such as are commonly used to convey granular material, and in particular an intake nozzle for such machines.

BACKGROUND OF THE INVENTION

Machines for conveying particulate or granular material using a vacuum are well known, for example for use in conveying grain. These machines allow pickup of granular material with a flexible hose that allows considerable freedom of movement. A fan or air pump is used to establish a flow of air from the intake end of the hose through the machine to a discharge. An intake nozzle at the end of the hose is placed in the granular material, and the air being sucked into the intake end carries picks up granular material and establishes a stream of mixed air and granular material that is carried through the hose. Typically the hose is in turn attached to a rigid tube, with the tube and hose forming an intake conduit between the vacuum conveyor and the intake nozzle. Sections of tube are added or removed, depending on the distance between the vacuum conveyor and the granular material.

When the intake end of the nozzle is placed into a pile of granular material, the flow of air is substantially blocked, and so a vent is provided on the intake nozzle so that air can enter the nozzle and maintain the flow of granular material. Such vents typically comprise one or more slots cut into the wall of the nozzle, although numerous variants are known. Typically a baffle is also provided to vary the area of the vent that is open, and so allow an operator to regulate the flow of air in through the vents in accordance with the particular material being conveyed, the length of the intake conduit between the vacuum conveyor and the intake nozzle, and other like operating conditions.

SUMMARY OF THE INVENTION

It is an object of the present invention to provide an intake nozzle for vacuum particulate conveyors that overcomes problems in the prior art. It is a further object of the present invention to provide such an intake nozzle that includes a ramp portion extending upward and downstream from the intake conduit or nozzle wall. Advantageously, air vents are provided in the intake nozzle in conjunction with the ramps.

In a first embodiment the invention provides an intake conduit apparatus comprising an intake conduit adapted at a downstream output end thereof for connection to an intake of a vacuum conveyor, and adapted at an upstream input end thereof to facilitate entry of granular material. At least one ramp slopes inward and downstream from a portion of an interior of a wall of the intake conduit, and there is a vent hole through the wall of the intake conduit adjacent to a downstream end of the at least one ramp such that air enters the intake conduit adjacent to the downstream end of the at least one ramp.

In a second embodiment the invention provides an intake nozzle apparatus adapted for attachment at a down stream output end thereof to an input end of an intake conduit of a vacuum conveyor. The apparatus comprises a plurality of ramps arranged at intervals on the interior of a wall of the intake nozzle, each ramp sloping inward and downstream from a portion of an interior of the wall of the intake nozzle. There is a vent hole through the wall of the intake nozzle adjacent to a downstream end of at least one ramp such that air enters the intake nozzle adjacent to the downstream end of the at least one ramp.

When conveying granular material from a storage bin with a vacuum conveyor substantial portions of the intake conduit will typically be oriented generally horizontally. Until the bin is drained down somewhat, the intake nozzle will as well be oriented generally horizontally as well. In such a horizontal position the granular material tends to enter the bottom of the nozzle and remains there while traveling through the intake conduit, held down by gravity. There is thus frictional resistance between the granular material and the walls of the intake conduit, and as well the speed of the air stream is less near the sides of the intake conduit.

Capacity is improved with the intake nozzle of the invention by moving the granular material toward the middle of the intake conduit where it can better mix with the air stream. Ramps are provided at intervals along the intake nozzle sloping inward and downstream from the wall of the nozzle. It may also be advantageous, especially where the intake conduit is lengthy, to install such ramps at intervals along the entire conduit if desired. For convenience, so that the sections do not have to be oriented so that the ramp is on the "bottom", ramps can be placed entirely around the interior of the intake conduit or nozzle. This has the further advantage of moving granular material from all edges of the conduit toward the center where the air velocity is greater.

In an intake nozzle, the centralizing action of the ramp can be accentuated by providing a vent hole in conjunction with the ramp so that the air comes into the nozzle under the ramp. The incoming air helps to move the granular material toward the center of the nozzle as the granular material comes off the downstream end of the ramp and is met by the air entering the nozzle through the vent.

Conveniently the ramps are provided by making a cut through a portion of the wall of the intake nozzle, leaving the cut portion attached to the wall at an upstream end thereof. The cut portion of the wall is pushed inwards to form a ramp sloping inward and downstream from the wall, leaving a hole in the wall. In this way the air vents that are required in all nozzles for allowing air to enter the nozzle are economically provided at the same time as the ramps are provided.

In one embodiment a cut is made in the wall perpendicular to the axis, and then and then is pushed in to form a rounded ramp that is closed on the sides such that the air entering the vent hole enters in a direction corresponding to the downstream direction of the ramp, such that turbulence is reduced.

A plurality of such cuts are made to provide ramps and vent holes around the nozzle wall. A baffle can be added to open or close the vent holes as required.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
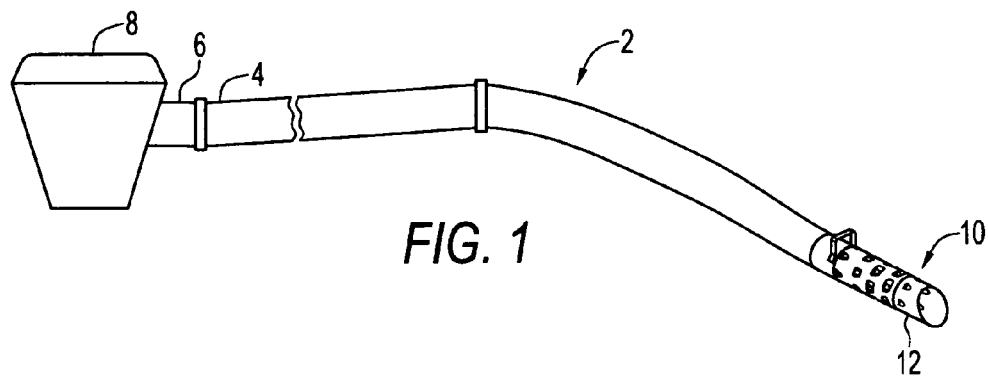
FIG. 1 is a schematic perspective view an intake conduit of the invention attached to a vacuum conveyor.

FIG. 1 illustrates an intake conduit 2 of the invention adapted at a downstream output end 4 thereof for connection to an intake 6 of a vacuum conveyor 8. The intake conduit 2 is adapted at an opposite upstream input end 10 to facilitate entry of granular material to be moved by an air stream from the input end 10 to the vacuum conveyor 8, and thus through the output of the vacuum conveyor 8 as is well known in the art. The typical intake conduit comprises a section of rigid tubing attached to a flexible hose to allow the input end 10 to be maneuvered. In the illustrated embodiment the intake conduit 2 further comprises a cylindrical intake nozzle 12 attached at the upstream input end 10, as further illustrated in FIG. 2.

Figure 3:
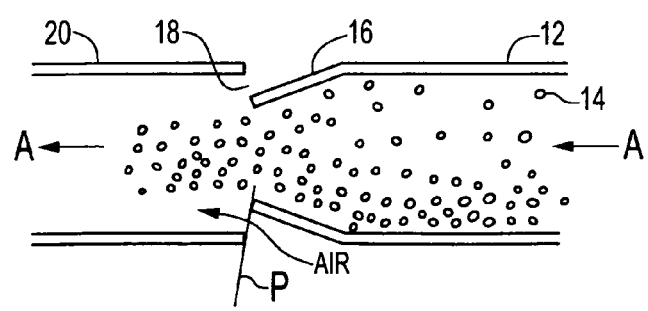
FIG. 3 is a schematic cross-sectional side view of the intake nozzle of FIG. 1.

FIG. 3 schematically illustrates the air stream created by the vacuum conveyor flowing through the intake nozzle 12 in the direction A carrying granular material 14 through the intake nozzle 12. Typically the intake nozzle 12 will be oriented substantially horizontally as illustrated in FIG. 3 when loading granular material 14 from a full bin. Due to gravity the granular material 14 tends to fall toward the bottom of the intake nozzle 12 and remain there while traveling through the intake conduit.

In the present invention ramps 16 are arranged at intervals along the intake nozzle 12. The ramps 16 slope inward and downstream from a portion of the interior of the wall 18 of the nozzle 12. A vent hole 18 is provided through the wall 20 of the intake nozzle 12 adjacent to the downstream end of the ramp 16 such that air enters the intake nozzle 12 adjacent to the downstream end of the ramp 16.

Figure 2:
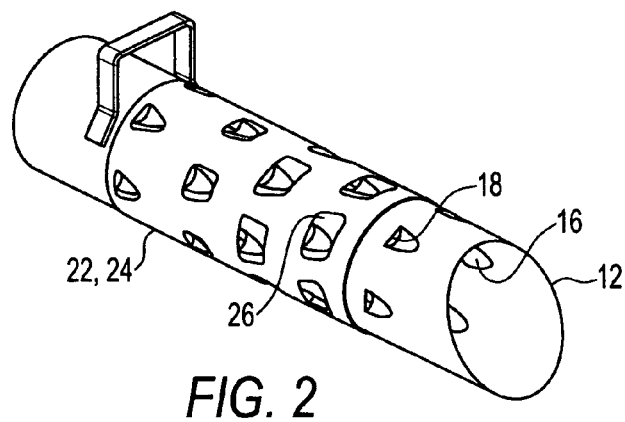
FIG. 2 is a perspective view of the intake nozzle of FIG. 1.
Figure 4:
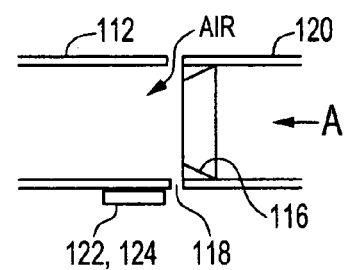
FIG. 4 is a schematic cross-sectional side view of an alternate embodiment of the intake nozzle of the invention.

In the illustrated embodiment of FIGS. 1–3 the ramps 16 conveniently comprise a partially cut out portion of the wall 20 of the intake nozzle 12. The cut out portion is left attached to the wall 20 at an upstream end thereof and is pushed inwards to form the ramp 16.

While the cut in the wall 20 to form the ramp 16 may be other shapes as well, in the illustrated embodiment, the cut is made substantially perpendicular to the axis of the intake nozzle 12, and then the portion of the wall 20 that is upstream from the cut is pushed in with rounded or cylindrical tool to form a curved ramp 16 and vent hole 18. Thus the partially cut out and pushed in portion of the wall 20 remains attached to the wall 20 on sides thereof such that the vent hole 18 is oriented substantially in a plane P that extends across the intake nozzle 12, as illustrated. The plane P is oriented at a small angle off perpendicular with respect to the axis if the intake nozzle 12 due to the geometry of the ramp 16.

A plurality of such cuts are made to provide ramps 16 and vent holes 18 around the intake nozzle 12, as illustrated in FIG. 2. As illustrated in FIG. 3, the granular material 14 moving along the bottom of the intake nozzle 12 is directed toward the center of the nozzle 12 by the ramps 16. The granular material 14 thus moves off the bottom of the nozzle 12 toward the middle thereof where it can better mix with the air stream. Since the ramps 16 are arranged around the intake nozzle 12, any granular material 14 moving along the wall 20 of the nozzle 12 is directed toward the center.

This centralizing action of the ramps 16 is accentuated by providing the vent holes 18 in conjunction with the ramps 16 so that the air comes into the nozzle 12 under the ramps 16. The incoming air helps to move the granular material 14 toward the center of the intake nozzle 12 as the granular material 14 comes off the downstream end of the ramps 16 and improves mixing of the granular material and the air. In the illustrated embodiment of FIGS. 1–3 the sloped and curved configuration of the ramp 16 and the orientation of the vent holes 18 generally across the intake nozzle 12 also directs air entering through the vent holes 18 smoothly into the air stream.

The illustrated manner of making the ramps 16 and vent holes 18 by cutting and pushing a portion of the wall 20 toward the center of the nozzle 12 is convenient and economical, and also orients the vent hole 18 and ramp 16 to advantage. The air enters intake nozzle 12 traveling generally smoothly in the downstream direction A under the granular material 14 coming off the downstream end of the ramp 16 such that the granular material 14 is prevented from falling to the bottom of the intake nozzle 12.

A baffle 22 can be added to open or close the vent holes 18 to adjust the amount of air entering for different conditions. In FIGS. 1 and 2 the baffle 22 comprises a sleeve 24 movably mounted around an outer perimeter of the intake nozzle 12 such that the sleeve 24 can slide or rotate with respect to the intake nozzle 12. The sleeve 24 defines a plurality of sleeve apertures 26 arranged such that when the sleeve 24 is moved to an open position, as illustrated in FIG. 2, the sleeve apertures 24 are substantially aligned with corresponding vent holes 18. It can be seen then that when the sleeve 24 is moved to a closed position the corresponding vent holes 18 are covered by the sleeve 24, and when the sleeve 24 is moved to an intermediate position between the open and closed positions the corresponding vent holes 18 are partially covered.

FIG. 4 schematically illustrates an alternate embodiment comprising a ramp 116 that is formed by a collar around the inside of the intake nozzle 112. Vent holes 118 are punched through the nozzle wall 120 just at the downstream end of the ramp 116. FIG. 4 also illustrates an embodiment wherein the baffle 122 comprises a gate 124 movably mounted on the intake nozzle 112 by a hinge, slide or the like such that when moved to a closed position the gate substantially covers the vent hole 118, and when the gate 124 is moved to an open position, as illustrated in FIG. 4, the vent hole 118 is substantially uncovered.

It may also be advantageous, especially where the intake conduit is lengthy, to install ramps at intervals along the entire intake conduit.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An intake conduit apparatus comprising:

an intake conduit adapted at a downstream output end thereof for connection to an intake of a vacuum conveyor, and adapted at an upstream input end thereof to facilitate entry of granular material;

a first ramp sloping inward and downstream from a portion of an interior of a wall of the intake conduit upstream from an open end of the input end of the intake conduit;

a second ramp sloping inward and downstream from a portion of an interior of a wall of the intake conduit upstream from the first ramp;

a vent hole through the wall of the intake conduit adjacent to a downstream end of each ramp such that air enters the intake conduit adjacent to the downstream end of each ramp.

2. The apparatus of claim 1 comprising a plurality of ramps and corresponding vent holes arranged at intervals along a length of the interior of the wall.

3. The apparatus of claim 2 wherein the intake conduit comprises an intake nozzle at the upstream input end thereof, and wherein the plurality of ramps and vent holes are located in the intake nozzle.

4. The apparatus of claim 3 wherein at least one ramp comprises a partially cut out portion of the wall of the intake nozzle attached to the wall at an upstream end thereof and pushed inwards to form the at least one ramp.

5. The apparatus of claim 4 wherein the partially cut out and pushed in portion of the wall of the intake nozzle is attached to the wall on sides thereof such that the vent hole is oriented substantially in a plane that extends across the intake nozzle.

6. The apparatus of claim 4 wherein the vent hole and ramp are curved.

7. The apparatus of claim 3 further comprising an adjustable baffle operative to selectively cover at least a portion of at least one vent hole.

8. The apparatus of claim 7 wherein the intake nozzle is cylindrical and wherein the baffle comprises a sleeve movably mounted around an outer perimeter of the intake nozzle.

9. The apparatus of claim 8 comprising a plurality of sleeve apertures defined by the sleeve and arranged such that when the sleeve is moved to an open position the sleeve apertures are substantially aligned with corresponding vent holes, and when the sleeve is moved to a closed position the corresponding vent holes are covered by the sleeve, and when the sleeve is moved to an intermediate position between the open and closed positions the corresponding vent holes are partially covered.

10. The apparatus of claim 7 wherein the baffle comprises a gate movably mounted on the intake nozzle such that when moved to a closed position the gate substantially covers at least one vent hole, and when the gate is moved to an open position the at least one vent hole is substantially uncovered.

11. An intake nozzle apparatus adapted for attachment at a down stream output end thereof to an input end of an intake conduit of a vacuum conveyor, the apparatus comprising:

a plurality of ramps arranged at intervals along a length of the interior of a wall of the intake nozzle, each ramp sloping inward and downstream from a portion of an interior of the wall of the intake nozzle;

a vent hole through the wall of the intake nozzle adjacent to a downstream end of at least one ramp such that air enters the intake nozzle adjacent to the downstream end of the at least one ramp.

12. The apparatus of claim 11 wherein at least one ramp comprises a partially cut out portion of the wall of the intake nozzle attached to the wall at an upstream end thereof and pushed inwards to form the at least one ramp.

13. The apparatus of claim 12 wherein the partially cut out and pushed in portion of the wall of the intake nozzle is attached to the wall on sides thereof such that the vent hole is oriented substantially in a plane that extends across the intake nozzle.

14. The apparatus of claim 13 wherein the vent hole and ramp are curved.

15. The apparatus of claim 11 further comprising an adjustable baffle operative to selectively cover at least a portion of at least one vent hole.

16. The apparatus of claim 15 wherein the intake nozzle is cylindrical and wherein the baffle comprises a sleeve movably mounted around an outer perimeter of the intake nozzle.

17. The apparatus of claim 16 comprising a plurality of sleeve apertures defined by the sleeve and arranged such that when the sleeve is moved to an open position the sleeve apertures are substantially aligned with corresponding vent holes, and when the sleeve is moved to a closed position the corresponding vent holes are covered by the sleeve, and when the sleeve is moved to an intermediate position between the open and closed positions the corresponding vent holes are partially covered.

18. The apparatus of claim 15 wherein the baffle comprises a gate movably mounted on the intake nozzle such that when moved to a closed position the gate substantially covers the at least one vent hole, and when the gate is moved to an open position the at least one vent hole is substantially uncovered.

* * * * *